W. G. TEMPLETON.
WEIGHING SCALE.
APPLICATION FILED MAR. 22, 1913.
1,269,759.
Patented June 18, 1918.
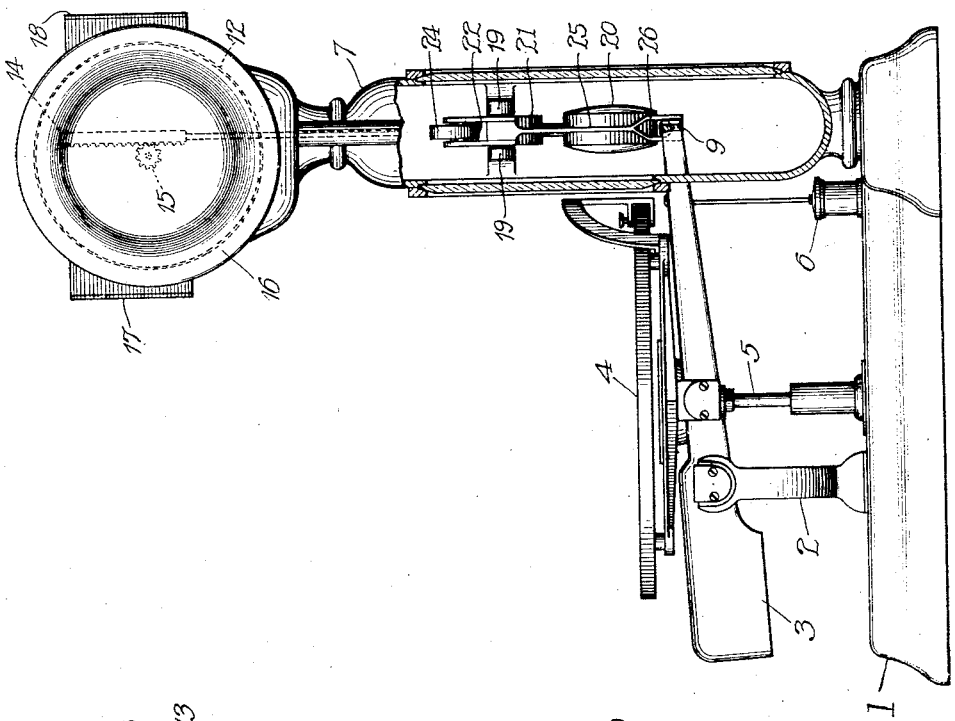
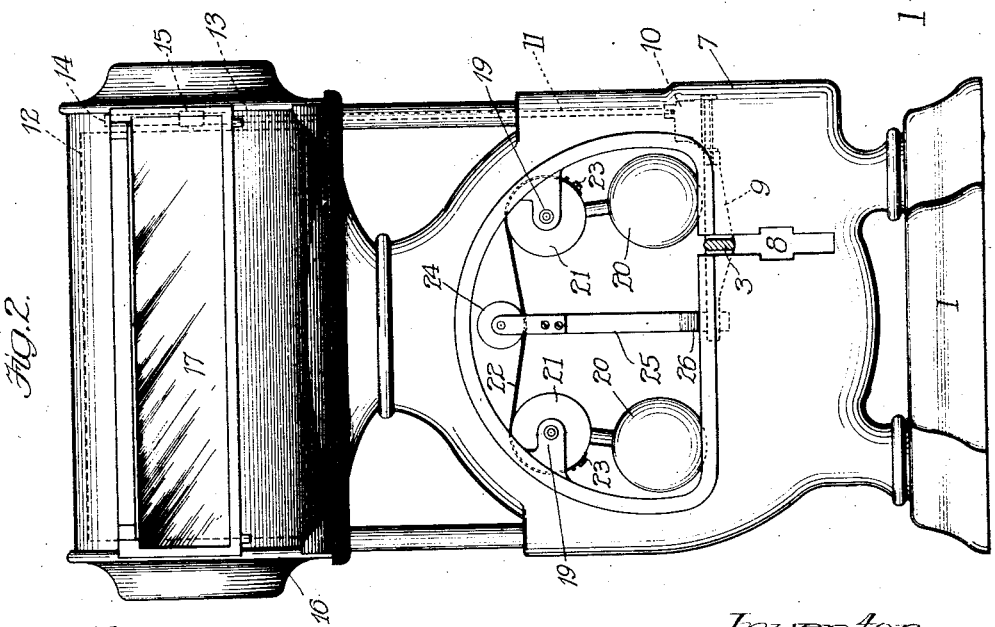
Witnesses
Martin H. Olsen
Robert Dobberman
Inventor
William G. Templeton
By Rector Hibben Davis & Macauley
Attys.

UNITED STATES PATENT OFFICE.

WILLIAM G. TEMPLETON, OF COLORADO SPRINGS, COLORADO, ASSIGNOR, BY MESNE ASSIGNMENTS, TO TOLEDO SCALE COMPANY, OF TOLEDO, OHIO, A CORPORATION OF NEW JERSEY.

WEIGHING-SCALE.

1,269,759.      Specification of Letters Patent.      Patented June 18, 1918.

Application filed March 22, 1913. Serial No. 756,204.

*To all whom it may concern:*

Be it known that I, WILLIAM G. TEMPLETON, a citizen of the United States, residing at Colorado Springs, in the county of El Paso and State of Colorado, have invented certain new and useful Improvements in Weighing-Scales, of which the following is a specification.

My invention relates more particularly to that class of scales in which the means for offsetting the weight of the load or commodity being weighed takes the form of a pendulum. In such a scale the position of the indicator device, whether it be a hand, a revolving chart, or other means, depends upon the position of the pendulum with reference to the other parts of the scale and as a consequence if, by reason of any inequality or slant of the surface upon which the scale is supported the latter is tilted from its intended vertical position, the pendulum causes the indicator to shift from its true zero position. It is an object of my invention to prevent this incorrect reading of the scale by providing a pair of pendulums which jointly offset the load or article being weighed and are so pivoted and connected to each other and to the scale mechanism that they offset the effect upon each other of any tilting of the scale so that the indicator maintains its true zero position, notwithstanding any irregularity or inclination of the support upon which the scale rests.

In the accompanying drawings I have shown, and in the following specification, described in detail a form of scale embodying my invention. It is to be understood, however, that the detailed disclosure is for the purpose of exemplification only and that the invention may take many and various forms, the scope of the invention being set forth in the following claims in which I have endeavored to distinguish it from similar constructions of the prior art without, however, relinquishing or abandoning any part or feature thereof.

In the accompanying drawings Figure 1 is a side elevation partly in vertical section of a scale to which my invention has been applied and Fig. 2 a front elevation in which, however, for the sake of clearness, the lever and other parts in front of the casing are removed, the lever being shown in section.

The base 1, horn 2, lever 3, scale pan 4, check 5, and dashpot 6 are or may be of any usual or preferred form. At its rear end the lever 3 enters the casing 7 through a slot 8 and is formed or provided on the inside of said casing with a crosshead 9, one arm of which is connected to the load offsetting means and the other end pivoted to a rocker 10 to which is connected the rack-rod 11 by which the rotary chart 12 of the indicator 13 is rotated. The rack 14 engages a pinion 15 on one end of the chart for this purpose. The chart is shown as inclosed within a housing 15 mounted upon the casing 7 and provided with the usual sight openings 17—18. The mechanism so far as described is common in this art and forms no part of my present invention but the latter is more particularly concerned with the load offsetting means to be now described. Within the casing 7 and upon brackets 19—19, are pivoted the members of a pair of pendulums 20—20, each of which has mounted upon a journal or axis thereof a curved disk, 21—21. A flexible ribbon 22 of steel or other suitable material is stretched between the disks 21—21 and connected to said disks at its opposite ends by ordinary fastenings 23—23. Intermediate the two pendulum structures a friction wheel 24 rests upon the ribbon and supports the link 25 to which it is pivoted and which in turn is connected by a stirrup 26 with the end of the scale lever. The roller 24 is free to take an intermediate position on the strap 22 or to shift thereon and permits free movement of the ribbon or strap 22 with relation thereto. From this construction it follows that when a weight or load of commodity is placed upon the scale platform the end of the lever is depressed drawing upon the roller 24 through the connecting link 25 and thereby causing the pendulums to move outward and upward to a position to counterbalance the load on the scale pan. At the same time by the connection between the beam and the indicator chart or drum the latter is revolved to indicate the correct weight of the article or commodity and, in case a computing chart is used, to indicate the value of the article on the scale pan at any desired price per unit of weight. Obviously if the scale be tilted and one of the pendulums moved thereby to release a certain amount of slack in the connection 22 the other pendulum will move to take up such slack, the net result being that the indicator will give a correct indication, notwithstanding that the base of the scale is inclined.

I claim:

1. In a weighing scale, the combination of a frame, a pair of pendulums pivotally mounted therein, a flexible connection between the pendulums engaging the pendulum tangentially and held normally horizontal by the pull of the pendulums thereon, a load-receiver, and a connection from said flexible connection to the load-receiver.

2. In a weighing scale, the combination of a frame, a pair of pendulums pivotally supported thereon, a continuous flexible connection between the pendulums, a load receiver, and a freely sliding connection from said flexible connection to the load receiver.

3. In a scale of the class described having a beam, a pair of pendulums, a flexible connection between the pendulums engaging the pendulums tangentially and held normally horizontal by the pull of the pendulums thereon, and a connection between said flexible connection and the scale beam.

4. In a scale of the class described having a beam, platform and indicator, a pair of pendulums, disks rigidly connected to said pendulums, a continuous ribbon attached at its opposite ends to said disks and a link connected at one end to the beam and having at its other end an attachment to the ribbon which is movable longitudinally thereof.

5. In a scale of the class described, having a beam, platform, and weight indicator operated by the beam, a pair of pendulums, a flexible connection between the pendulums and a shiftable connection between said flexible connection and the scale beam.

6. In a weighing scale, a lever, a pair of pendulums, each provided with a disk, a flexible connection secured at its opposite ends to and passing partially around said disks and a laterally shiftable connection between said flexible connection and lever.

7. In a weighing scale, and in combination with the frame, beam, and platform thereof, a pair of pendulums each provided with a disk, a flexible connection secured at its opposite ends to and passing partially around said disks and a laterally shiftable connection between said flexible connection and beam.

8. In a weighing scale, and in combination with the frame, lever, and platform thereof, a pair of pendulums each provided with a disk and pivoted to a stationary part of the frame, a flexible ribbon secured at its opposite ends to the disks and passing partially around the same, a roller supported on the flexible connection, a link in which the roller is journaled and which is connected to the lever, to be operated thereby.

9. In a weighing scale and in combination with the frame thereof, a pair of pendulums pivoted in the frame, a pair of disks secured to and moving with the pendulums, respectively, a ribbon of flexible material secured to the disks and passing partially around the same, a link, a roller journaled on the link, and resting on the ribbon, and a load receiver connected to the link.

10. In a weighing scale having a frame, a pair of pendulums pivotally supported therein, a flexible ribbon engaging the pendulums tangentially and directly connecting the pendulums with each other, said ribbon being held normally taut in a substantially horizontal position when the pendulums are in normal position, a load-receiver, and a connection from the load-receiver to the flexible ribbon.

WILLIAM G. TEMPLETON.

Witnesses:
J. W. MATTHEWS,
F. O. VALENTINE.